Patented Jan. 29, 1935

1,989,603

UNITED STATES PATENT OFFICE 1,989,603

RECOVERY OF GOLD FROM COLLOIDAL SLUM AND OTHER COLLOIDAL MATERIALS

Benjamin George Nicholl, Rutherglen, Victoria, Australia

No Drawing. Application July 19, 1933, Serial No. 681,221. In Australia July 28, 1932

1 Claim. (Cl. 75—185)

In the recovery of gold from colloidal slum and other colloidal materials in accordance with this invention, the material is formed into a slurry by treatment with an aqueous cyanide solution and adding a depolarizing agent to this slurry whereby the hydrogen ion concentration is altered so that the colloidal particles absorb ions of opposite polarity to those ions producing stabilization of the said particles, and to regenerate the decomposed cyanide an alkali is also added to the said slurry.

The hydrogen ion concentration is altered to an extent approximating $pH_6$ (Sorensen's constant) and the quantity of the depolarizing agent employed should be just sufficient to produce maximum flocculation in addition to neutralizing the polarity of the colloidal particles.

I have found that aluminium sulphate is an efficient and economical depolarizing agent and the addition of such an agent reduces the concentration and converts a portion of the free cyanide into hydrocyanic acid which appears to increase the solubility of the gold. The free cyanide is then regenerated by the addition of lime (CaO), and the hydrogen ion concentration raised to above $pH_6$ so as to recover all free cyanide and to give sufficient protective alkalinity to prevent further formation of hydrocyanic acid.

The cyanide solution thus regenerated is found to dissolve gold leaf more rapidly than freshly made cyanide solution of the same strength.

By way of example and without limiting the scope of the invention I have ascertained that with slums available in the Rutherglen alluvial district of the State of Victoria and elsewhere in Australia, and which have been up to the present incapable of payable treatment the following employment of my method will produce commercially satisfactory results.

Thus in my regular treatment operation I add approximately 2½ lbs. $Al_2(SO_4)_3 18H_2O$ to 1 ton of dry slum which has already been slurried with an aqueous cyanide solution of convenient strength (approximately .01% sodium or potassium cyanide). After complete diffusion I add a minimum of 3 lbs. CaO per ton to kill the cyanicides formed during depolarization and regenerate cyanide and afford protective alkalinity. The amount of $Al_2(SO_4)_3 18H_2O$ added will vary according to the hydrogen ion concentration of the slum and the added $KC_y$ so as to bring the hydrogen ion concentration as close as possible to $pH_6$ (Sorensen's constant), as too much $Al_2(SO_4)_3$ would convert the slum to colloid of opposite sign and maximum coagulation occurs at $pH_6$.

During the additions of both the aluminium sulphate and lime, the mass is kept in a state of agitation for about an hour by means of a pump and agitator, after which additional lime may be added to give the cyanide solution any necessary additional protection or to improve precipitation, but no more additional lime should be added than necessary as this would so increase alkalinity that more $Al_2(SO_4)_3$ would be required on the subsequent charge to reach $pH_6$, using the same solution.

The pulp is then pumped to a settling vat, where after settlement of the coagulated slum, the clear solution carrying gold is siphoned off and passed through boxes containing zinc shavings, zinc dust, or carbon whereon the dissolved gold is precipitated. The precipitate is subsequently removed and treated for the recovery of the gold by one of the generally used processes.

I now use zinc shavings in a trough containing a number of compartments, and at each clean up dissolve the zinc from the first compartment in sulphuric acid then roast the precipitate. Afterwards this precipitate is fluxed and smelted for final recovery of the gold.

Hitherto this slum has defied all known methods of commercially profitable treatment, the nearest approach being the intimate admixture of the dry slum with the same weight of dry sand and leaching the mixture in very shallow vats (approximately 25 feet diameter x 1' 6" deep). This process necessitates much labor, and can only be carried out in small scale treatment, and where sand is conveniently available.

I claim:—

In the recovery of gold from colloidal slum and other colloidal materials forming the same into a slurry with an aqueous cyanide solution of a strength approximating .01% sodium or potassium cyanide, adding aluminium sulphate to the slurry in the proportion of about 2½ lbs. to one ton of the dry colloidal material under treatment to vary the hydrogen ion concentration of the slum to approximately $pH_6$ Sorensen's constant and simultaneously regenerating the cyanide decomposed during the process by the addition of a minimum of 3 lbs. of lime per ton of the said slurry.

BENJAMIN GEORGE NICHOLL.